US010484831B1

(12) United States Patent
Helms et al.

(10) Patent No.: US 10,484,831 B1
(45) Date of Patent: Nov. 19, 2019

(54) LOCAL EPHEMERAL LOCATION TRACKING OF MOBILE DEVICE USERS

(71) Applicant: Radius Networks Inc., Washington, DC (US)

(72) Inventors: David Helms, Arlington, VA (US); Marc Wallace, Arlington, VA (US); Scott Yoder, Washington, DC (US); Michael Harper, Bent, OR (US); James Nebeker, Arlington, VA (US); Christopher Sexton, McLean, VA (US)

(73) Assignee: Radius Networks Inc., Washington, DC (US)

( * ) Notice: Subject to any disclaimer, the term of this patent is extended or adjusted under 35 U.S.C. 154(b) by 0 days.

(21) Appl. No.: 16/232,849

(22) Filed: Dec. 26, 2018

(51) Int. Cl.
| | |
|---|---|
| *H04W 24/00* | (2009.01) |
| *H04W 4/029* | (2018.01) |
| *G01S 5/02* | (2010.01) |
| *H04W 4/021* | (2018.01) |

(52) U.S. Cl.
CPC ........... *H04W 4/029* (2018.02); *G01S 5/0252* (2013.01); *H04W 4/021* (2013.01)

(58) Field of Classification Search
CPC ...... H04W 4/029; H04W 4/021; G01S 5/0252
USPC ..................................................... 455/456.1
See application file for complete search history.

(56) References Cited

U.S. PATENT DOCUMENTS

| | | | |
|---|---|---|---|
| 9,373,091 B1* | 6/2016 | Belser | G06Q 10/00 |
| 2014/0122040 A1* | 5/2014 | Marti | G06F 17/5009 703/6 |
| 2014/0247279 A1* | 9/2014 | Nicholas | G06T 19/006 345/633 |
| 2016/0192130 A1* | 6/2016 | Kahn | H04W 4/021 455/456.3 |
| 2017/0156042 A1* | 6/2017 | Kwan | H04W 4/90 |

* cited by examiner

*Primary Examiner* — Amancio Gonzalez
(74) *Attorney, Agent, or Firm* — Vierra Magen Marcus LLP

(57) ABSTRACT

The disclosure relates to technology for determining a location of a user in a physical venue without need for the user to carry extraneous devices. The method includes installing a background peripheral service (BPS) in a personal mobile device routinely carried by the user where the BPS outputs a temporary ID sequence (TID) when activated. The signal strength of the TID is measured at scanner locations each time the BPS is activated and the measured strengths are used to determine the location of the user. The TID is used to identify an order placed by the user for goods and/or services. This allows a human server to locate the user and deliver the goods and/or services to that user.

20 Claims, 3 Drawing Sheets

LOCAL EPHEMERAL LOCATION TRACKING OF MOBILE DEVICE USERS

BACKGROUND

There is a growing demand for wireless location tracking systems that accommodate the behaviors and needs of tracked users. Some existing wireless location monitoring or tracking systems use short range wireless transmitters and receivers for fine resolution location determination. These systems generally require users to carry extraneous locator devices (ones they normally do not posses, often ones belonging to the venue) where the locator devices repeatedly or continuously broadcast an identification signal and a location indicating signal that pinpoints the current location of an identified locator device within a given venue. More specifically, such existing systems typically operate by detecting nearby short-range radio tags or transponders (RFIDs) embedded in user-adjacent and fixedly positioned items of the venue such as fixedly positioned seats, tables or racks in the venue (e.g., a retail environment). The extraneous wireless locator devices carried by the users relay the locator-identifying information and location-identifying information of the detected tags (RFIDs) to a location correlating central processor. The processor then consults a database to convert the locator-identifying information into user-identifying information and to provide fine resolution customer location information.

This known approach has several shortcomings. For example, the wireless locator device must be intentionally placed by a customer within a very short distance, (e.g., approximately one inch away) from the to-be-detected radio tag (location-identifying transponder). If the customer is not aware of this requirement, the location tracking solution may not function properly and locating the customer to a desired level of resolution becomes difficult. Due to the continuous or often repeated transmissions of the locator-identifying information and the location-identifying information, batteries in the extraneous locator devices rapidly run out of energy and need to be frequently recharged.

Also, it is increasingly common to find retail locations equipped with movable seating, tables and product racks as opposed to fixedly-located ones. As this furniture is moved about in the venue, it becomes increasingly difficult to determine the customer's location based on the detection of the furniture's embedded radio tags.

It is to be understood that some concepts, ideas and problem recognitions provided in this description of the Background may be novel rather than part of the prior art.

BRIEF SUMMARY

In one embodiment, a method is provided for automatically tracking a location of a user of a routinely-carried mobile device in a physical venue to within a predetermined spatial resolution, where the method comprises: (a) detecting presence of the mobile device within a scanners-covered area of the venue; (b) obtaining a current hardware address code of the detected mobile device; (c) using the obtained current hardware address code to repeatedly attempt to dynamically connect to a predetermined background peripheral service (BPS) installed in the detected mobile device, where the BPS is configured to output a wireless signal including a temporary identification sequence (TID) when the BPS is connected to, the TID being one that has been pre-assigned to the BPS; (d) receiving at one or more of the scanners of the venue, the wireless signal output by the BPS; (e) determining the strength of the received wireless signal and acquiring the TID provided within the received wireless signal; (f) sending the determined signal strength and acquired TID to at least one of plural data processors; (g) processing the sent signal strength by at least one of the data processors to thereby determine a location of the detected mobile device to within the predetermined spatial resolution; and (h) outputting by at least one of the data processors a location signal representing the determined location and identification of the detected mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

Figure 1:
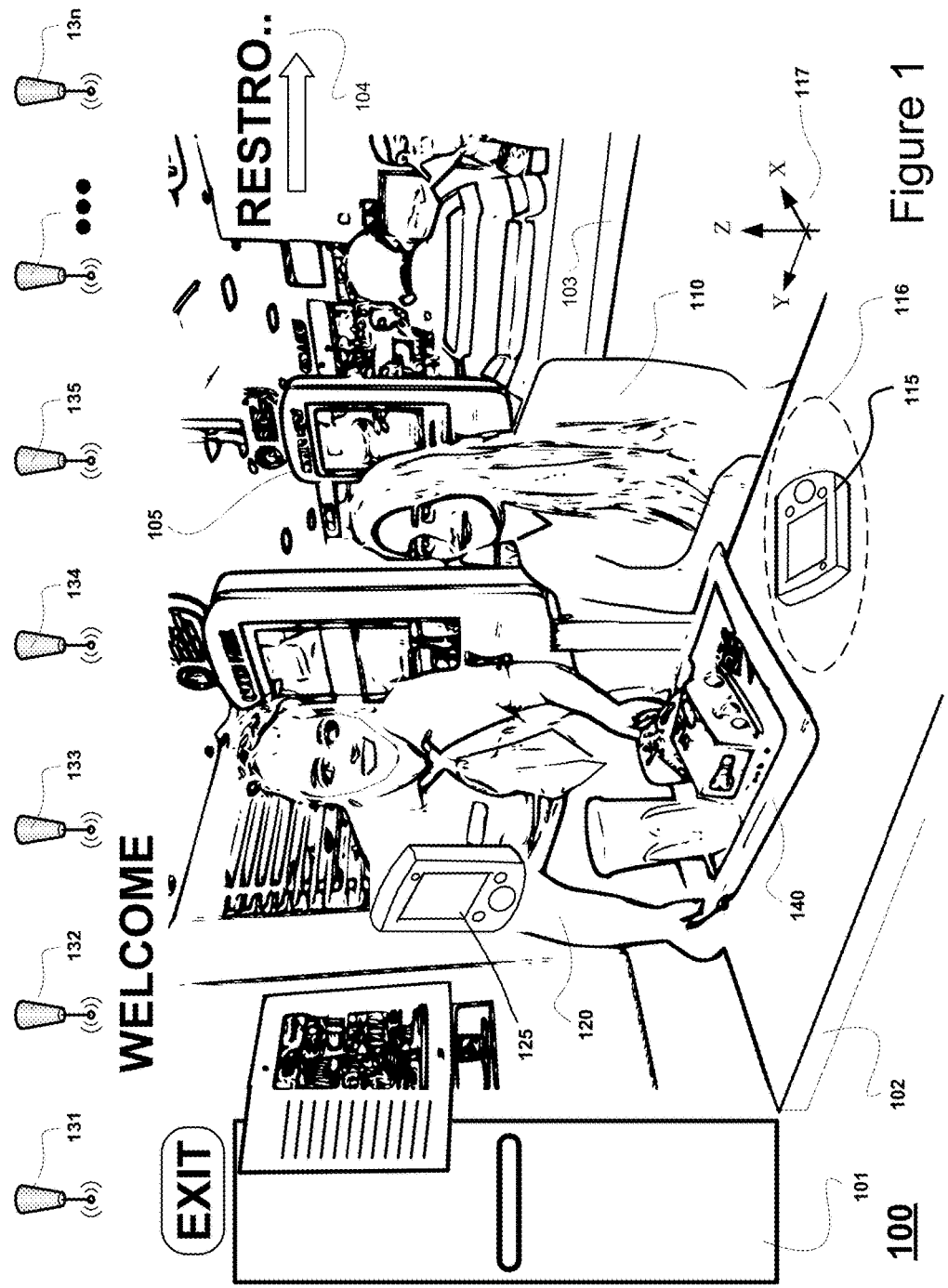
FIG. 1 is a schematic diagram of an environment in which a provider of goods and/or services might wish to pinpoint the location of a mobile user through use of a mobile device normally carried by the user.

The disclosure relates to technology using wireless network resources to pinpoint to a desired level of fine resolution the location of a mobile user by use of a mobile wireless device normally or routinely carried by the user (e.g., the user's smartphone, smart watch or other such routinely carried or worn mobile device). More specifically, the disclosure relates to a technology using wireless transmitters, wireless receivers and a correlating database to determine likely locations of the user in a physical venue based on localized scanning for the user's mobile device when in a scan-covered area of the venue.

Locating of users of personal mobile devices is known for relatively coarse levels of resolution. For example, cellular towers may be used to determine presence of cellular smartphones within respective telephone communication cells or as the user crosses from one cell to the next (and invokes a cellular handover) or by means of proximity triangulation. In another example, the user's mobile device uses GPS satellite technology to determine its location to a resolution of a few meters (e.g., 10's of meters) and then broadcasts this information. However, for finer levels of resolution based on short range broadcasts, various problems occur including ones noted above. Additionally, repeated broadcasting of fine resolution location information may consume battery power, processor bandwidth and interfere with various normal services that a user may wish to obtain from his/her personal mobile device.

In an embodiment in accordance with the present disclosure, a user's personal mobile device is pre-configured to contain a background peripheral service (BPS) that transmits a temporary unique identification (TID) when the service is temporarily connected to. One or more locally disposed scanners at a vendor's venue attempt the connection when the user arrives at the venue and then the scanners detect the invoked BPS transmission of the TID. Based on signal strength received by the scanner(s) within the given venue, a likely one or more pinpointing locations of the user is/are automatically determined to a desired level of resolution (e.g., about 1 meter or less). The user's identification is determined from the transmitted TID. The user/consumer does not have to carry any extraneous other devices (e.g., a LED flashed wireless identification pager or the like). The determined location(s) of the user's personal mobile device is/are then used to more efficiently deliver a product and/or a service to the user. Upon successful delivery, in one embodiment, the BPS and its TID are deleted. Thus they are temporary add-ons that operate only when within the range of the venue and only until the transaction there completes. User privacy is secured.

Being able to locate a user in an efficient manner within a specific physical venue increases the user's perception of the level of service and convenience provided by the vendor at the venue. The speed of delivery also improves task completion efficiency for the vendor and reduces costs. Because the user's personal mobile device is utilized without use or aid of extraneous other devices provided by the vendor, cost and complexity is reduced for the vendor. The user/customer does not have to carry extraneous other devices and such devices do not need to be retrieved and recharged. Use of the background peripheral service (BPS) allows the user to at the same time utilize foreground applications of his/her mobile device while waiting for provision of the requested goods and/or services, thus enhancing user experience. User privacy is maintained by limiting the tracking actions to just within the venue and in one embodiment, deleting the BPS and its TID once successful delivery of product(s) and/or service(s) occurs.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the present teachings. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

FIG. 1 illustrates an environment (e.g., a retail venue) 100 in which it is desirable to pinpoint to a predefined resolution 116 of about one meter or less (e.g., to within one foot) the location of a user 110 of a personal mobile device (e.g., smartphone) 115 relative to a predefined spatial frame 117 (e.g., a 3D or 2D one) so that requested goods (e.g., food items 140) and/or services (e.g., provided by server 120) may be expeditiously provided to the user as soon as practical.

More specifically, although the figure illustrates the sought after user 110 as being already seated at a specific and fixedly located seat 103 and/or next to a fixedly located table 102 at the time a dispatched server 120 seeks and finds that user, it is to be understood that the requested goods and/or services (140) may have been ordered via a mobile ordering application (e.g., one executed in personal device 115 and via the internet) even before the user entered a scanners-covered area of the establishment (e.g., through entrance/exit way 101). Before selecting a table and/or seat (e.g., 102/103) to settle at, the user may have first gone to the restrooms 104. The user may have temporarily stepped outside and then come back. The user may have first explored an upstairs seating area (not shown) before deciding to instead use the selected downstairs table and/or seat 102/103. The user may have first gone to a self serve ordering kiosk 105 or to a manned customer service counter (not shown, understood to be further in the background). The point here being that in general the user can be a moving target in a 3-dimensional (3D) or 2-dimensional (2D) search space 117. It is the task of the dispatched server 120 to expeditiously seek and find the requestor (110) of the respective goods and/or services (e.g., 140) when the user is present within a scanners-covered area and when the requested goods and/or services are ready to be provided.

In accordance with the present disclosure, the user's personal mobile device 115 is configured at the time an order for the respective requested goods and/or services (140) is placed (e.g., over the internet; or at a later time) to be automatically repeatedly but temporarily interrogated by near field (e.g., range of a few meters) or longer range scanners (e.g., 131-13*n*) disposed about the establishment (e.g., in tiled ceiling areas and/or other suitable locations) so as to thereby automatically and repeatedly determine the location 116 of that device 115 to an appropriate predefined level of resolution (e.g., about 1 meter or less). In one embodiment, the scanners 131, 132, . . . 13*n* (where n is a predetermined integer) are Bluetooth™ receivers configured to not only communicate in accordance with the Bluetooth™ protocol but also to measure and report on the relative strength of received signals. The measured relative strength (e.g., on a scale of 0 to 10, or 0 to 100 or other and not necessarily linear) can indicate how close or far away from a given scanner is a Bluetooth™ transmitter having nominal transmission power. The scanners are also configured to automatically detect occasional presence advertisement or beacon signals output by each user's personal device which signals include a current hardware address code (HAC) with which the device can be currently addressed. (For some platforms the HAC comes in the form of a Media Access Control address (or MAC address) output by smartphones such as 115). It is to be understood that the vendor's venue will typically have a large number of data processors distributed there about and that the scanners (e.g., 131-13*n*) will each typically have at least one of the data processors combined with programmed memory for causing the recited scanner actions including the automatically repeated but temporary interrogations of detected mobile devices for presence of installed BPS's with respective TID's and/or the automatic determination of relative wireless signal strength as received at each scanner.

When a user (e.g., 110) enters a spatial volume covered by the scanners (131-13*n*), for example that on the inner side of entrance doorway 101, and his/her personal mobile device 115 automatically (autonomously) broadcasts its HAC-containing advertising signal (as provided for by the device operating system or OS), at least one of the scanners detects the beacon broadcast and relays the detected HAC to a database. It is then determined whether the user has already placed an order and if so, what the state of the order is (e.g., is it ready for being delivered to the user?). Using the detected HAC, an interrogation signal is directed to the specific user's personal mobile device 115 requesting to connect to a previously established background peripheral service (BPS) within the personal mobile device. More specifically, the BPS is configured to temporarily awaken and respond to the connection request by transmitting a Bluetooth™ signal containing a previously assigned and relatively unique temporary identification sequence (TID) that is pre-associated with the user's order. The BPS then automatically goes back to sleep. Thus battery charge is not continuously or frequently consumed by the process. While waiting for delivery of the requested goods and/or services (e.g., 140) the user is able to use foreground apps and/or services of his/her personal mobile device (115). Scanners which detect the one time broadcast Bluetooth™ signal with its embedded TID each measures the relative strength of the received TID (if detected at all) and report it to a network server. The network server then automatically determines one or more likely pinpointed locations of the responding personal mobile device 115. When it is determined that the corresponding user 110 has settled into a relatively stable location (e.g., at or near table/seat 102/103) within the scanner-covered area, a human server 120 (or robotic) is dispatched with the requested goods (140 if any) and automatically given instructions as to where the user is located. In one embodiment, the dispatched human server 120 carries her own mobile device 125. The human server's mobile device 125 is configured to automatically repeatedly provide updates on change of location, if any, of the targeted user 110. This allows the human server 120 to seek and find the targeted user 110 even if the targeted user is moving.

Figure 2:
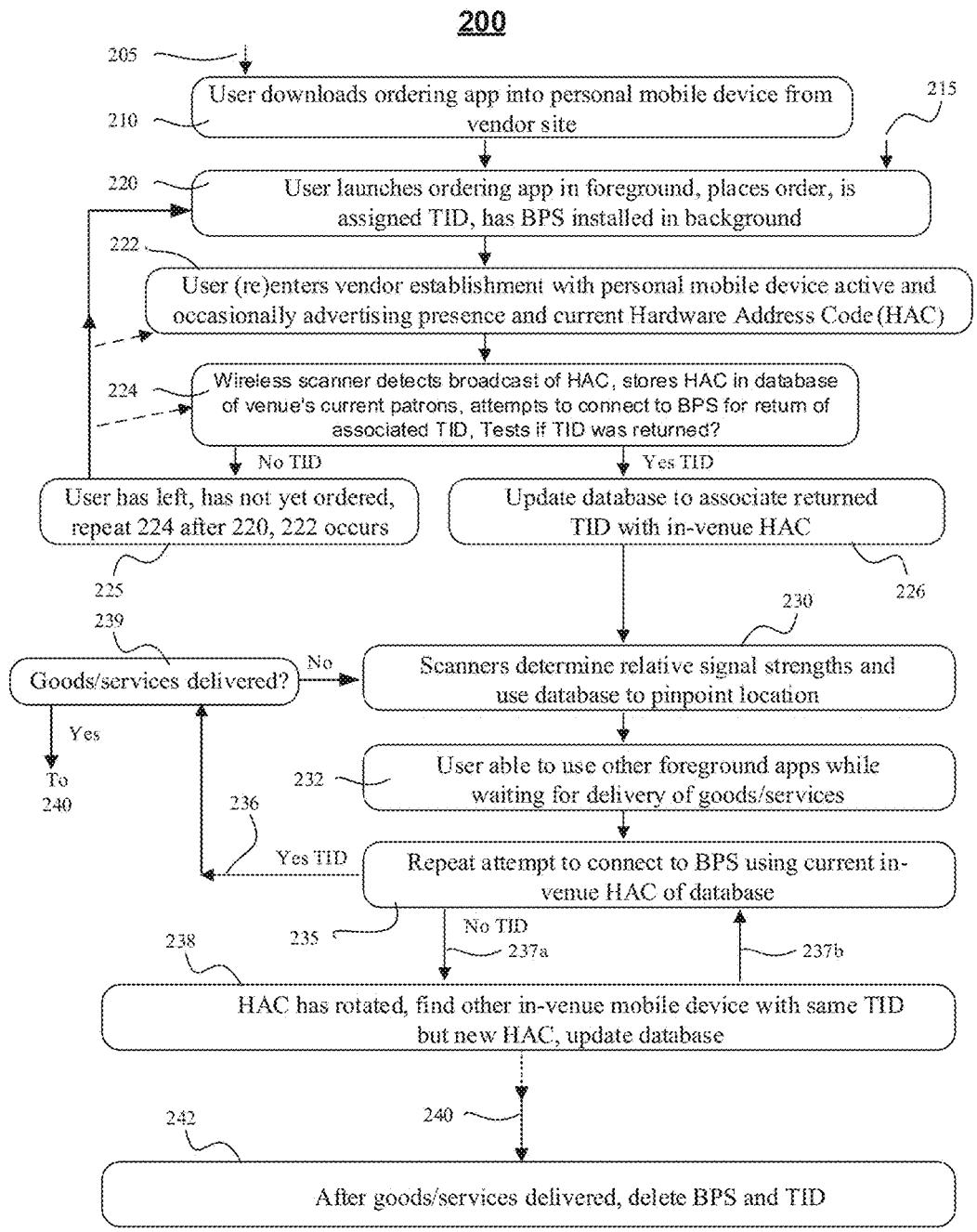
FIG. 2 illustrates a method for determining a location of a user using a personal mobile device carried by the user.

FIG. 2 illustrates a method 200 for determining a location of a user using a personal mobile device carried by the user. Entry for first-time use of the method 200 may occur at 205, whereas later entry may occur at 215. In step 210 the user downloads into his/her normally used personal mobile device (e.g., smartphone 115, or a smartwatch or another normally or routinely carried and/or worn personal wireless device) an order or request submitting application (app) that is configured for placing orders or requests to one or more prespecified vendors and/or vendor venues (e.g., fast food establishments, sit-down restaurants, big box store item pickup areas). The order or request submitting application (app) may be downloaded via the Internet and from one or more vendor-specified websites. In one embodiment, the order or request submitting app may first be downloaded into a desktop or laptop computer of the user and then transferred into his/her personal mobile device.

In a subsequent step 220, the user launches the app as a foreground executed process on his/her normally used personal mobile device (e.g., smartphone 115) and orders or requests various goods and/or services for provisioning at one or more app-compatible vendor venues in accordance with order-placing guidance is provided by the app. Typically, the app will cooperate with an in-cloud server and obtain an identification of the user and an identification of a time range in which the user expects provisioning of the ordered goods and/or services to occur. Once the ordering details are completed, the in-cloud server will download a unique and temporary identification number or other sequence (TID) to the personal mobile device (115) where this TID is uniquely associated with the specific order. The app will also establish within the user's personal mobile device a background peripheral service (BPS) which may be dynamically connected to buy external devices (e.g., the scanners 131-13n in the vendors venue). When this established BPS is connected to, and it temporarily awakens, broadcasts a Bluetooth™ signal containing the TID that has been assigned to the order and then goes back to sleep. The BPS does not block the user from accessing foreground applications or services on his/her personal mobile device and does not consume significant battery power. Steps 210 and 220 may be carried out in the user's transport vehicle, home, office or elsewhere as convenient. They need not occur while the user is present in the vendor's scanners-covered establishment.

In a subsequent step 222 the user (110) enters a scanners-covered area of the vendor's establishment while carrying his/her normally used mobile device (e.g., smart phone 115). For one class of embodiments (e.g., Apple iPhones™) the operating system (OS) of the mobile device automatically detects presence of external Bluetooth™ devices and occasionally broadcasts its own Bluetooth™ advertising signals to thereby autonomously advertise its presence in the area and declare a current hardware identification address code (HAC) by way of which the personal device may be addressed. In one embodiment, the OS occasionally changes the HAC by which it is to be addressed.

In step 224 a Bluetooth™ receiver (e.g., one of scanners 131-13n) detects the advertised HAC and checks a local database to determine if that HAC is already recorded in an area of the database listing current in-venue HAC's. If not there, the new HAC is added to the current in-venue HAC's listing with a timestamp indicating time of first recognition (e.g., first entry) into the area. Old HAC's having a timestamp earlier than a moving time window may be automatically deleted from the listing by a garbage collecting subroutine.

Also in step 224, the detected HAC is used to address the corresponding personal device and to attempt to dynamically connect to the aforementioned background peripheral service (BPS) that may have been established inside that personal device. If it is true that the BPS has been established inside that personal mobile device, the BPS is temporarily awakened, it responds by transmitting a Bluetooth™ signal including the uniquely-assigned TID and then it goes to sleep again.

Step 225 represents the case where the addressed personal mobile device does not return a TID (No TID). There could be a number of different reasons for this. One of them is that the user has not yet placed an order using the BPS establishing app. Another is that the user may have temporarily shut off his/her personal mobile device and/or temporarily stepped out and away from the scanners-covered area. In such cases control is returned to one of steps 220, 222 and 224 as appropriate. The dashed return lines represent the selective choice of which of steps 222 and 224 is to be returned to based on circumstances.

Step 226 represents the case where the addressed personal mobile device does (Yes) return a TID. This condition informs the system that the in-venue and responding personal mobile device (115) has been used to place an order and the returned TID identifies that order (and optionally the person who placed the order, when so done and from where). The local database is then updated to logically associate the current HAC of the responding mobile device with the returned TID and with the corresponding order of requested goods and/or services (e.g., 140).

At subsequent step 230, each of the individual scanners in the scanners-covered area determines if it received the returned TID and if so (if the transmitted signal has a strength above a predetermined signal-to-noise threshold), at what relative level of signal strength. The determined relative levels of signal strength (where 0 may indicate no TID signal detected above background noise at this time and 10 may indicate a TID detected at maximal signal strength) are returned to the database for analysis. In one embodiment an expert knowledge database system has location determining rules pre-stored in it for the respective local venue where the rules are heuristically developed and optimize the pinpointing of one or more most locations, to a desired level of resolution, of where the TID outputting mobile device is located. The determined pinpoint location is reported to an order management system. In one embodiment, the order management system tracks movements of the user and/or his/her personal mobile device so as to determine when the user has settled at a relatively stable waiting location and what the coordinates of that location are. The order management system may then dispatch a human or robotic server to deliver the requested goods and/or services to the located user. Of course the user may move once again, and if so updated location information is wirelessly transmitted to the dispatched human or robotic server. Available level (e.g., fineness of) of location resolution may be dependent on the number of, closeness to each of the other of, and locations of the scanners (131-13n) as well as whether all of them are operational, on background noise then present in the scanners-covered area, on signal strength measurement capabilities of the scanners, on radio signal reflection properties of the area, on transmission strengths of respective personal mobile devices of respective users and other factors.

Step 232 represents a waiting time for the being-tracked user (e.g., 110). During this waiting time 232, the user may access and use one or more foreground apps and/or services of his/her personal mobile device while not interfering with the occasional and temporary reawakening's of the TID-broadcasting background peripheral service (BPS). The user-accessible one or more foreground apps and/or services may include games, web browsers, email applications, social media applications and so forth. The user therefore can be entertained or may conduct work tasks while waiting for delivery of the requested goods and/or services (e.g., 140).

While the user is waiting (as represented by step 232), a concurrent and automatically repeated other step 235 attempts to reconnect to the established BPS of the HAC-addressed personal mobile device so as to again awaken the BPS, have it repeat its transmission of the corresponding TID and then go back to sleep. If in the HAC-addressed personal mobile device responds again with the assigned TID (Yes), flow path 236 is taken and as long as the requested goods and/or services have not yet been delivered (as determined in step 239), control returns to step 230 from which the loop is repeated as long as a TID is returned at step 235. The frequency of repetition of connection re-attempting step 235 may be a variable one. Each time the connection attempt is made and responded to by the user's personal mobile device, battery power is consumed in the mobile device. Thus to minimize consumption of battery charge out of the personal mobile device, the scanning system may intelligently vary the rate of its connection re-attempts 235 based on inferred states of the user. More specifically, if the user appears to be settled into a relatively stable step with minimized relocation, the rate of re-attempts can be reduced, for example down to a predetermined minimum rate, to thereby reduce battery consumption in the mobile device. On the other hand, if the user and/or his/her mobile device appear to be still moving/re-locating by speeds greater than a predetermined threshold and/or by distances greater than the desired degree of resolution (e.g., 2 feet) for expeditiously delivering the requested goods and/or services to that on-the-move patron, then the rate of connection re-attempting 235 may have to be increased, for example up to a predetermined maximum rate for sake of keeping track of where the user is and/or for predicting where the user is heading towards.

If the result of reconnection attempting step 235 is that no TID is returned, then path 237a is instead taken. For sake of security, some operating systems (e.g., that of the Apple iPhones™) automatically repeatedly change their hardware address code (e.g., MAC address) on a semi-random basis. Thus, if no TID is returned at reconnection attempting step 235, the likelihood is that the targeted personal mobile device has changed (e.g., rotated) its current HAC. The new HAC will have been automatically determined in step 222 (which is carry out repeatedly for sake of finding other in-venue devices) and used for invoking the BPS of the mobile device, receiving the TID and storing the result in the local database. Step 238 represents the recognition that this change of HAC has happened and represents an updating of the database to erase the cross association between the TID and the old and now obsolete HAC while reconfiguring the process to instead use the new HAC. Control may then be passed via flow path 237b to step 235 (or alternatively to bypass 235 and proceed along flow path 236) so the loop continues until the order management system determines at step 239 that the goods and/or services have been delivered to the located user.

After the requested goods and/or services have been satisfactorily delivered to the located user, flow path 240 is followed to step 242 where the BPS is automatically deleted from the user's personal mobile device and the TID is automatically deleted from the local database. This deletion step 242 assures that the BPS and TID are ephemeral objects which disappear after the order has been fulfilled. As a result, the system stops tracking the user because no TID is returned when step 224 later attempts to reconnect to that personal mobile device. The user's privacy is therefore secured in that the details of the delivered order can no longer be found using the temporarily assigned TID.

Figure 3:
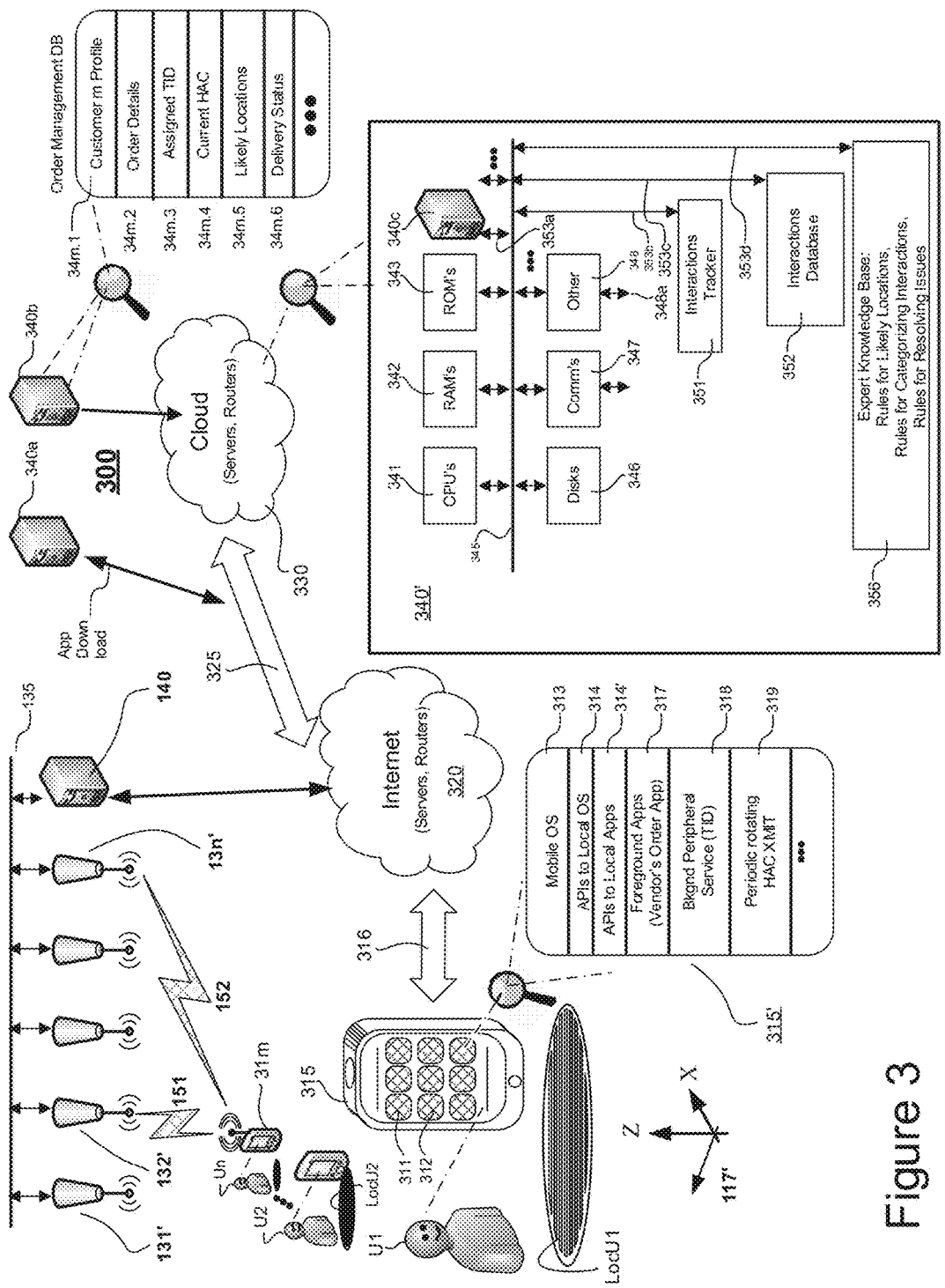
FIG. 3 illustrates a system for determining a location of a mobile user using a personal mobile device carried by the user.

FIG. 3 illustrates a system 300 that includes a portions for automatically determining a pinpointed location (e.g., LocU1) of a mobile user (e.g., U1) using a personal mobile device (e.g., 315) carried and/or worn by the user when the user has entered a repeatedly scanned area (e.g., 117') covered by scanners 131'-13n'. As indicated in magnified details area 315', the mobile device 315 typically has a predetermined operating system (OS) 313 currently executing within it. Device 315 may have a set of application program interfaces (APIs) 314 for allowing various further programs within the device 315 to access resources of the OS 313. In one embodiment, one of those API accessible resources of the OS is that for establishing one or more background peripheral services (BPSs) that may be dynamically and wirelessly connected to from external devices (e.g., scanners 131'-13n'). The executing OS 313 may on its own periodically test for presence of nearby Bluetooth™ devices (e.g., scanners 131'-13n') and in response to detected presence, occasionally wirelessly broadcast its own Bluetooth™ signal which includes its current HAC. In one embodiment, the broadcast Bluetooth™ signal has a unique and consistent signature portion (e.g., consistent for a given brand of personal devices, for example for Apple iPhones™) that is used for locating the HAC as being positioned at a predetermined bit position of fixed bit distance away form the unique signature portion. (The consistent signature portion of a given brand or style of personal mobile devices may be found by receiving, recording and comparing plural advertisements from such devices and identifying a least frequently changing portion. The location of the occasionally changing HAC may be found as a slightly more frequently changing portion.) The HAC is extracted using this offset method even though the HAC itself changes on a pseudorandom basis. The schematic of FIG. 3 illustrates the code for occasionally transmitting a rotating HAC being disposed at section 319 of the personal mobile device. The schematic of FIG. 3 also depicts one of the established BPSs at area 318 as being one which transmits a Bluetooth™ signal including an associated TID when connected to. Various foreground programs that may be used by the user while waiting for delivery of goods and/or services are depicted as being present in area 317. APIs to the local apps in the mobile device are depicted as being present in area 314'. An example GUI for the mobile device is depicted at 315 with application invoking icons such as 311 and 312 being present on the displayed graphical user interface. One of the application invoking icons (e.g., 311 or 312) may cause a launching of a vendor's ordering application which is stored in area 317 after being downloaded for example from a vendor controlled server 340a located in cloud 330 or elsewhere on the Internet 320.

FIG. 3 more broadly depicts an integrated client-server/internet/cloud system 300 (or more generically, an integrated multi-device system 300) within which the here disclosed technology may be implemented. System 300 may be understood as being an automated machine system having distributed intelligent resources including a variety of differently-located data processing and data communication mechanisms including for example, user-carried/worn mobile wireless units (e.g., wireless smartphones 315, . . . , 31m) configured to allow end-users thereof (e.g., U1, U2 . . . Um) to request from respective end-user occupied locations (e.g., LocU1) services from differently located enterprise hosts (e.g., on-internet 320 and/or in-cloud servers 340a, 340b, etc.). In one embodiment, server 340a handles the downloading of vendor ordering apps into mobile devices that request them. The downloading process may include generating unique customer profiles (e.g., including billing information) and customer identifications that are to be used when the respective customers place orders at a later time. In one embodiment server 340b handles the managing of placed orders. Server 340b may include or connect to an order management database which keeps track for each order-placing user (e.g., user Um, where m is an integer) of: (a) the user's customer profile 34m.1, (b) the details of the placed order 34m.2; (c) a temporary and unique transaction identification sequence (TID) 34m.3 assigned to the corresponding transaction; (d) a current hardware address code (HAC) being currently used by the customer's personal mobile device (e.g., 31m.4); (e) a current one or more pinpointed locations 34m.5 within the vendor's venue where the customer is determined to most likely be present at; (f) information about the delivery status 34m.6 of the requested goods and/or services that the present transaction is directed to; and optionally additional information as may be appropriate for the vendor's business model.

It is to be understood that the illustrated configuration of system 300 is merely exemplary. As indicated, it comprises at least a few, but more typically a very large number (e.g., thousands) of end-user devices 315 (only a few shown in the form of wireless smartphones but understood to represent many similarly situated mobile and/or stationary client machines—including the smartphone wireless client kinds, smart watches, and cable-connected desktop kinds). These end-user devices 315 are capable of originating service requests which are ultimately forwarded to service-providing host machines (e.g., in-cloud servers like 340b) within a cloud environment 330 or otherwise on-internet or linked-to internet machines (e.g., 140). Results from the service-providing host machines are thereafter typically returned to the end-user devices (315, . . . 31m) and displayed or otherwise communicated to the end-users (e.g., U1, U2, . . . , Um, m being an integer). For example, if the business of the vendor is an online, food pre-ordering one, the end-user (U1) may have installed on his/her smartphone (315) a software application ("app" 317) that automatically requests from the order managing server 340b, a list of nearest vendor venue locations, the menu of the items that may be ordered online and estimates for when the items will be ready for pick up at a selected one of the venues. In response to the request, enterprise software and hardware modules automatically identify the user, pull up a user profile (e.g., 34m.1), store the order details (34m.2), assign a temporary and unique transaction identification sequence (TID) 34m.3 to the corresponding transaction (install it into a corresponding BPS) and inform the customer of a time range when he or she might arrive at the venue to pick up the order. The assigned TID may be downloaded into the BPS of the ordering app at that time order placement or at a later time before it is needed.

When the customer (e.g., Um) arrives at the designated venue and enters an area covered by the location pinpointing scanners (131'-13n') of the venue, the process 200 depicted in FIG. 2 is automatically carried out. Briefly, the presence of the HAC-advertising mobile device is detected; an attempt is made to dynamically connect wirelessly to the TID-returning BPS of that mobile device; the TID is detected by at least one of the location pinpointing scanners (131'-13n') and the respective strength of the TID-providing signal is measured at respective one of the scanners. More specifically and merely as an example, if TID-returning signal 151 has the same relative strength as TID-returning signal 152 then it may be automatically determined that the corresponding mobile unit 31m is located midway between scanners 132' and 13n'. As another example, a set of scanners forming a closed regular polygon and each receiving the TID at just above a predetermined signal strength threshold are identified and the personal mobile device is automatically determined to be at the center of formed polygon (e.g., a triangle, rectangle, etc.). The scanners report their respective detections and measurements to a local server 140. The local server 140 then consults with a database or expert rules knowledge base to pinpoint the most likely one or more locations for the targeted customer in view of other factors (e.g., background noise, radio reflections, etc.) that may be currently present at the venue. The pinpointed one or more locations are then relayed to a human or robotic server for assisting in quickly delivering the requested goods and/or services to the customer. In one embodiment, signal coupling from each of the scanners (131'-13n') to the local server 140 is a wireless one such as conducted over a Wi-Fi network. Alternatively, Bluetooth™ signals may be used where one scanner (e.g., 131') relays its detections and measurements to the next adjacent scanner (e.g., 132') and so on until the collected detection and measurement reports are relayed to the local server 140. Signals coupling link 135 represents the various ways in which the respective detections and measurements of the scanners (131'-13n') are relayed to the local server 140. The signals coupling link 135 may be a wired one and/or may include wired and wireless subportions as opposed to being an all wireless signals coupling link.

In one embodiment, after receiving the respective detections and measurements of the scanners as well as the detected TID sequence, the local server 140 connects via the Internet 320 to the order management server 340. The order management server 340 uses the relayed TID sequence to reference the corresponding customer order details 34m.1-34m.6 of user Um. The order management server 340 may additionally consult with an expert knowledge base 356 to determine, based on the relayed signal measurements of the scanners, what the one or more most likely locations of the customer are at the respective venue and for the extant conditions there. When the ordered goods and/or services are ready for delivery to the customer, the order management server 340 reports the latest one or more most likely locations of the customer to the human or robotic deliverer (e.g., 120), for example as a sorted list of most to least likely locations, to a mobile device (e.g., 125) possessed by the deliverer. After the delivery is reported as complete, the corresponding TID is erased from the user's mobile device and also from the database storage locations (e.g., 34m.3).

Aside from the end-user devices (e.g., 315, ..., 31m) and the cloud servers (e.g., 340b) the system 300 comprises: one or more wired and/or wireless communication fabrics 316, 325, 135 (shown in the form of bidirectional interconnects) intercoupling the end-user client devices (e.g., 315, ..., 31m) with the various networked servers (e.g., 140, 340a, 340b).

Still referring to FIG. 3, a further walk through is provided here with respect to detailed components that may be found in one or more of the mobile devices and/or respective servers. Item 311 represents a first user-activatable software application (first mobile app) that may be launched from within the exemplary mobile client 315 (e.g., a smartphone, but could instead be a tablet, a laptop, a wearable computing device; i.e. smartwatch or other). Item 312 represents a second such user-activatable software application (second mobile app) and generally there are many more. Each end-user installed application (e.g., 311, 312) can come in the form of nontransiently recorded digital code (i.e. object code or source code) that is defined and stored in a memory for instructing a target class of data processing units to perform in accordance with end-user-side defined application programs ('mobile apps' for short) as well as to cooperate with server side applications implemented on the other side of communications links 316, 325, etc. In one embodiment and the case where an order is placed for respective goods and/or services by way of a non-mobile or not normally used client machine (e.g., a desktop computer), the order management server 340b automatically recognizes this condition and uses data available in the customer's profile 34m.1 to access the user's normally carried, personal mobile device and to transfer the assigned TID to that normally carried personal mobile device. In this instance, it is understood that appropriate, vendor provided software has been preloaded into the normally carried personal mobile device for securely enabling such transfer of the TID to the targeted mobile device. In this way, even if the customer places the order by way of a home desktop computer and then arrives at the venue with his/her normally-used mobile device, the customer tracking subsystem will still work.

More generally, each app (e.g., 311, 312, 317) may come from a different business or other enterprise and may require the assistance of various and different online resources (e.g., Internet, Intranet and/or cloud computing resources). Each enterprise may be responsible for maintaining in good operating order its portions of the system (e.g., local scanners, local servers, Internet, Intranet and/or cloud computing resources). Accordingly, the system 300 is shown as including in at least one server 340', an expert knowledge base 356 which contains various kinds of different expert rules for handling different conditions. One set of expert rules may provide for optimized customer location pinpointing when all the scanners (e.g., 131'-13n') at a given venue are operational. Another set of expert rules may provide for less than optimum but acceptable customer location pinpointing when less than all of the scanners are operational and/or background noise is high. Yet another set of expert rules may provide for variable location determination based on different sets of furniture layout at each respective venue and/or based on expected radio interferences and/or reflections at the given venue. Yet other of the expert rules may relate to categorizing different types of transactions and details about how to handle them, including how to resolve various problematic issues.

In addition to the expert knowledge base 356, one or more other portions of the system 300 may contain interaction tracking resources 351 configured for tracking interactions between customers and respective vendors and an interactions storing database 352 configured for storing and recalling the tracked interactions. Links 353a (to a further server 340c), 353b, 353c and 353d represent various ways in which the system resources may communicate one with the other.

As mentioned, block 340' is representative of various resources that may be found in client computers and/or the various servers. These resources may include one or more local data processing units (e.g., CPU's 341), one or more local data storage units (e.g., RAM's 342, ROM's 343, Disks 346), one or more local data communication units (e.g., COMM units 347), and a local backbone (e.g., local bus 345) that operatively couples them together as well as optionally coupling them to yet further ones of local resources 348. The other local resources 348 may include, but are not limited to, specialized high speed graphics processing units (CPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), local user interface terminals and so on.

It is to be understood that various ones of the merely exemplary and illustrated, "local" resource units (e.g., 341-348) may include or may be differentiated into more refined kinds. For example, the local CPU's (only one shown as 341) may include single core, multicore and integrated-with-CPU kinds. The local storage units (e.g., 342, 343, 346) may include high speed SRAM, DRAM kinds as well as configured for reprogrammable, nonvolatile solid state data storage (SSD) and/or magnetic and/or other phase change kinds. The local communication-implementing units (only one shown as 347) may operatively couple to various external data communicating links such as wired, wireless, long range, short range, serial, parallel, optical kinds typically operating in accordance with various ones of predetermined communication protocols (e.g., internet transfer protocols, TCP/IP, Wi-Fi, Bluetooth™ and so on). Similarly, the other local resources (only one shown as 348) may operatively couple to various external electromagnetic or other linkages 348a and typically operate in accordance with various ones of predetermined operating protocols. Additionally, various kinds of local software and/or firmware may be operatively installed in one or more of the local storage units (e.g., 342, 343, 346) for execution by the local data processing units (e.g., 341) and for operative interaction with one another. The various kinds of local software and/or firmware may include different operating systems (OS's), various security features (e.g., firewalls), different networking programs (e.g., web browsers), different application programs (e.g., product ordering, game playing, social media use, etc.) and so on.

The advantages of the present teachings over the art are numerous. It is to be understood that the present teachings are not to be limited to specific disclosed embodiments. In the above description and for sake of simplicity, a restaurant venue is described. However, this disclosure may be applied, but not limited to, theaters (e.g., dinner theaters), stadiums, arenas, train stations, airports, big box store pickup areas and many other venues where it is desirable to track and pinpoint the location of a user of a normally carried and/or worn personal mobile device without encumbering the user to carry other devices not belonging to the user and/or not normally carried by the user.

In accordance with various embodiments of the present disclosure, the methods described herein may be implemented using one or more hardware computer systems that execute software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a digital processor of a digital programmable computer or other programmable data processing apparatus to produce a machine, such that the instructions, which execute via the processor of the computer or other programmable instruction execution apparatus, create a mechanism for implementing the functions/acts specified in the flowchart and/or block diagram block or blocks. All instructions need not be executed a by same one processor and can instead be distributed among a plurality of operatively cooperative processors. The terminology, 'at least one processor' as used herein is to be understood as covering both options, namely having one processor execute the all instructions or distributing the instructions for execution by two or more processors.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously or on an interrupted multi-tasking basis and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claimed subject matter.

What is claimed is:

1. A method for automatically tracking location of a mobile device in a physical venue to within a predetermined spatial resolution, the method comprising:
    detecting presence of the mobile device within a scanners-covered area of the venue;
    obtaining a current hardware address code of the detected mobile device;
    using the obtained current hardware address code to repeatedly attempt to dynamically connect to a predetermined background peripheral service (BPS) installed in the detected mobile device, where the BPS is configured to output a wireless signal including a temporary identification sequence (TID) when the BPS is connected to, the TID being one that has been pre-assigned to the BPS;
    receiving at one or more of the scanners of the venue, the wireless signal output by the BPS;
    determining the strength of the received wireless signal and acquiring the TID provided within the received wireless signal;
    sending the determined signal strength and acquired TID to at least one of plural data processors;
    processing the sent signal strength by at least one of the data processors to thereby determine a location of the detected mobile device to within the predetermined spatial resolution; and
    outputting by at least one of the data processors a location signal representing the determined location and identification of the detected mobile device.

2. The method of claim 1, wherein the mobile device is a personal mobile device normally or routinely carried and/or worn by a respective user of the personal mobile device.

3. The method of claim 2, wherein the personal mobile device is at least one of a smart phone and a smart watch.

4. The method of claim 1, wherein the BPS is configured to go to sleep after outputting the wireless signal including the TID.

5. The method of claim 1, wherein the hardware address code of the detected mobile device is one that is occasionally automatically changed by the detected mobile device, the method further comprising:
    obtaining a most current hardware address code of the detected mobile device;
    generating by at least one of the data processors a logical association between the acquired TID and the most current hardware address code of the detected mobile device.

6. The method of claim 1, wherein the automatic detecting of the presence of the mobile device within the scanners-covered area of the venue and the automatic obtaining of a current hardware address of the detected mobile device are both based on the mobile device autonomously advertising its presence wirelessly, the autonomously produced advertisement including the current hardware address of the mobile device.

7. The method of claim 6, wherein a bit position of the current hardware address code of the mobile device within the autonomously produced advertisement is displaced by a predetermined distance from a consistent signature portion of the advertisement and wherein the obtaining of the current hardware address code of the detected mobile device includes searching for the signature portion and then locating the current hardware address code at its respective bit position using the predetermined distance.

8. The method of claim 1, wherein the wireless signal output by the BPS is a Bluetooth™ signal.

9. The method of claim 1, wherein the predetermined spatial resolution is about one meter or less.

10. The method of claim 1, and further comprising:
determining when an order or request associated with the TID is complete and in response to the determined completion, erasing at least one of the TID and the BPS.

11. The method of claim 1, and further comprising:
in response to not receiving at any of the scanners of the venue, the wireless signal expected to be output by the BPS when the connection is attempted using an earlier obtained hardware address code, identifying a different hardware address code for which the same TID is returned and generating a logical association between the TID and the different hardware address code.

12. The method of claim 1, and further comprising:
varying a rate at which the repeated attempts to dynamically connect to the BPS are carried out.

13. The method of claim 1, and further comprising:
using over-time plural ones of the location signal to predict where a user of the mobile device is heading towards.

14. The method of claim 1, and further comprising:
using over-time plural ones of the location signal to infer that a user of the mobile device has settled at a stable location within the venue.

15. An apparatus determining location of a mobile device in a physical venue to within a predetermined spatial resolution, the apparatus comprising:
at least one of plural scanners operating to detect presence of the mobile device within a predetermined area of the venue based on a received advertisement signal autonomously transmitted by the mobile device;
at least one processor programmed to obtain a current hardware address code of the detected mobile device from the advertisement signal received by the at least one scanner;
at least one processor programmed to use the obtained current hardware address code and at least one of the plural scanners to repeatedly attempt to dynamically connect with a predetermined background peripheral service (BPS) installed in the detected mobile device so as to thereby temporarily activate the BPS, where the BPS is programmed to output a wireless signal including a temporary identification sequence (TID) when the BPS is connected to and thus activated and to then to go to sleep, the TID being one that has been pre-assigned to the BPS;
at least one processor programmed to receive TID detection and signal strength reports from one or more of the scanners and to thereby determine the TID and estimate a current location of the mobile device;
at least one processor programmed to generate a logical association between the determined TID and the current hardware address code of the detected mobile device; and
at least one processor programmed to output a location signal representing the determined location and identification of the detected mobile device.

16. The apparatus of claim 15, wherein the mobile device is a personal mobile device normally or routinely carried and/or worn by a respective user of the personal mobile device.

17. The apparatus of claim 15, wherein the automatic detecting of the presence of the mobile device and the automatic obtaining of a current hardware address code of the detected mobile device are both based on the mobile device autonomously advertising its presence wirelessly, the autonomously produced advertisement including the current hardware address code of the mobile device.

18. The apparatus of claim 17, wherein a bit position of the current hardware address code of the mobile device within the autonomously produced advertisement is displaced by a predetermined distance from a consistent signature portion of the advertisement and the obtaining of the current hardware address code of the detected mobile device includes searching for the signature portion and then locating the current hardware address code at its respective bit position using the predetermined distance.

19. The apparatus of claim 15, wherein the advertisement signal is a Bluetooth signal.

20. A computer system comprising one or more processors and a memory having collectively stored therein instructions that, when executed by the one or more processors, cause the one or more processor to:
detect presence of a mobile device within a scanners-covered area of a venue;
obtain a current hardware address code of the detected mobile device;
use the obtained current hardware address code to repeatedly attempt to dynamically connect to a predetermined background peripheral service (BPS) installed in the detected mobile device, where the BPS is configured to output a wireless signal including a temporary identification sequence (TID) when the BPS is connected to, the TID being one that has been pre assigned to the BPS;
in response to receiving at one or more of the scanners of the venue, the wireless signal output by the BPS, determine the strength of the received wireless signal and acquire the TID provided within the received wireless signal;
generate a logical association between the acquired TID and the current hardware address code of the detected mobile device,
use the determined signal strength to determine a location of the detected mobile device to within the predetermined spatial resolution; and
output a location signal representing the determined location and identification of the detected mobile device.

* * * * *